United States Patent [19]

Hatada et al.

[11] 4,270,853
[45] Jun. 2, 1981

[54] SOUND-RECORDING INSTANT-PRINTING FILM AND CAMERA THEREFOR

[75] Inventors: Kotaro Hatada; Masaru Higuchi, both of Toyonaka; Hiroshi Iwata, Ikoma, all of Japan

[73] Assignee: West Electric Company, Ltd., Osaka, Japan

[21] Appl. No.: 22,930

[22] Filed: Mar. 21, 1979

[51] Int. Cl.³ .......................................... G03B 29/00
[52] U.S. Cl. ..................................... 354/76; 354/86; 354/180; 360/2
[58] Field of Search .................... 354/75, 76, 83, 174, 354/180, 86; 360/2, 1, 3, 101; 353/15, 19, 120; 96/76 R, 76 C, 201

[56] References Cited

U.S. PATENT DOCUMENTS

| 3,081,678 | 3/1963 | Steineck | 354/76 |
|---|---|---|---|
| 3,379,095 | 4/1968 | Kaprelian | 353/120 |
| 3,439,598 | 4/1969 | Weitzner et al. | 354/76 |
| 3,643,571 | 2/1972 | Erlichman et al. | 354/174 |
| 3,685,836 | 8/1972 | Chernowitz | 360/101 X |
| 3,691,312 | 9/1972 | Petersen | 354/75 X |
| 3,807,851 | 4/1974 | Knox et al. | 360/2 X |
| 3,822,376 | 7/1974 | Kok et al. | 360/101 X |
| 4,090,662 | 5/1978 | Fayling | 360/2 X |

FOREIGN PATENT DOCUMENTS

| 2720575 | 11/1978 | Fed. Rep. of Germany | 354/76 |
|---|---|---|---|
| 1441236 | 6/1976 | United Kingdom | 360/2 |

Primary Examiner—John Gonzales
Attorney, Agent, or Firm—Cushman, Darby & Cushman

[57] ABSTRACT

Instant-printing film further comprises a magnetic sound-recording band on one end part thereof, and is installed in an instant-printing camera which has a sweeping magnetic recording/reproducing head that sweeps touching and along the magnetic sound recording band, thereby enables recording of ambient sound of the photographic scenery, or reproducing of the recorded sound while seeing the instant-printed photography.

16 Claims, 16 Drawing Figures

SOUND-RECORDING INSTANT-PRINTING FILM AND CAMERA THEREFOR

BACKGROUND OF THE INVENTION

1. Field of the Invention:

The present invention relates to sound-recording instant-printing films and photographic still cameras to be used for the films.

2. Prior Art:

Instant-printing films comprising small bag of developing solution for each frame of film are known. Such films can be developed in as short a time as several tens of seconds to several minutes within the camera by passing the film through pinching rollers provided in the camera thereby breaking the bag and spreading the developing solution on film emulsion. During the developing time, the user of the camera, namely the photographer, must wait for development thus wasting time.

SUMMARY OF THE INVENTION

The present invention provides a novel instant-printing film with sound recording media thereon and cameras therefor with which the photographer can take pictures and at the same time can record sound, for example, during waiting for the instant developing of the film. Thereby, besides the photographic scenery, the sound or voice around the time of or after the photographing can be recorded without carrying a tape recorder, but simply with a camera of the present invention.

DETAILED DESCRIPTION OF THE INVENTION

DETAILED DESCRIPTION OF PREFERRED EMBODIMENT

The present invention relates to a sound-recording instant-printing film with a camera which is capable of photographing, instant-printing and sound-recording.

Figure 1:
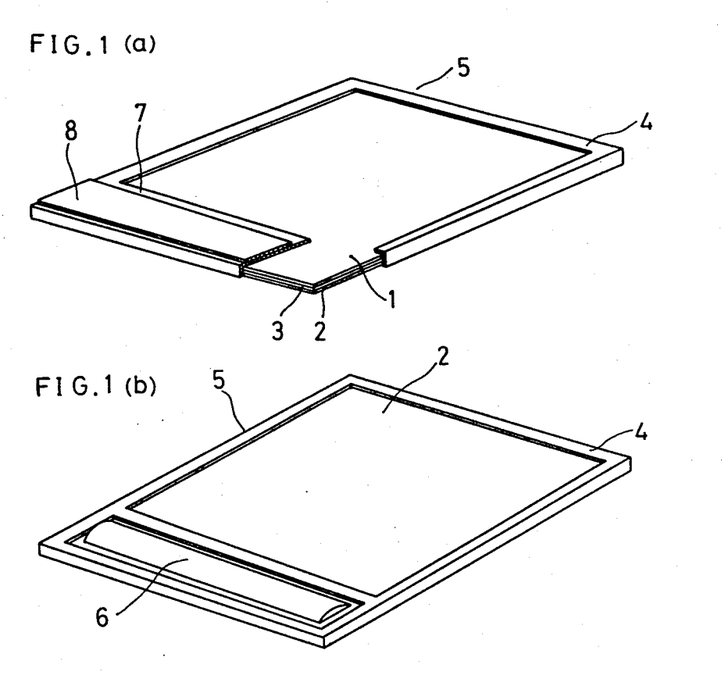
FIG. 1(a) is a fragmental perspective view of the front face of an example of an instant-printing film in accordance with the present invention.
FIG. 1(b) is a perspective view of the back face of the instant-printing film of FIG. 1(a).

The instant-printing film 5 in accordance with the present invention has a surface layer 1, a back sheet 2 and a photosensitive emulsion layer 3 inbetween forming a composite film. A peripheral member 4 is provided on peripheral parts of the composite film 1-2-3, to prevent pouring-out of developing solution out of the film during or after a development.

On one end part of back face of the instant-printing face is provided a bag 6 of the developing solution for developing and printing the photograph. The developing solution is squeezed out of the bag by known squeezing roller in a camera when the film is moved in the camera for developing and printing. Hitherto, an end part of a face of a film, opposite to the part having the developing solution bag 6, have been left vacant and blank. In the present invention, a magnetic sound-recording band 8 is provided in such vacant blank space as shown in FIG. 1(a). Namely, a known magnetic sound-recording strip band 8, which comprises a uniform layer of a mixture of a synthetic resin binder and a magnetic substance powder containing prinicpally $\gamma$-$Fe_2O_3$ ($\gamma$-hematite) or iron, is formed at an end part 7 and on the opposite face to the side of developing solution bag 6 of the instant-printing film 5. A known magnetic orientation treatment of the magnetic substance powder (principally of 0.8 $\mu$m needle shape crystals) in the lengthwise direction of the magnetic strip band 8 is carried out by applying a suitable magnetic field thereto, and the mixture is dried to form the magnetic sound-recording strip layer.

Figure 2:
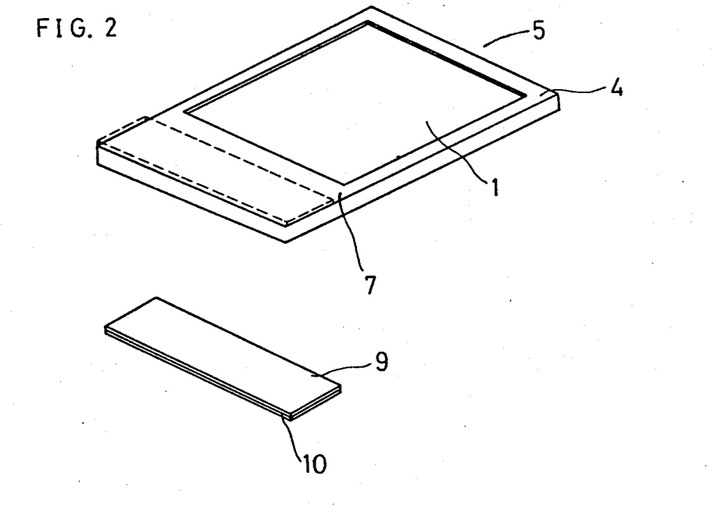
FIG. 2 is a perspective view of another example of an instant-printing film in accordance with the present invention.

FIG. 2 shows another example of an instant-printing film 5, wherein a strip of magnetic sound-recording sheet 9 is bonded by an adhesive layer 10 on a blank space 7 on an end part of a face of the instant-printing film 5 thereby to form a recording band. The magnetic sound-recording sheet 9 is made by forming a uniform layer of a mixture of a synthetic resin binder and a magnetic substance powder containing principally $\gamma$-$Fe_2O_3$ ($\gamma$-hematite) or iron on a plastic sheet. A known magnetic orientation treatment of the magnetic substance powder in the lengthwise direction of the strip sheet 9 and drying is made to form the strip sheet 9.

The abovementioned examples of the sound-recording instant-printing film has compatibility with the conventional instant-printing film, and the addition of the magnetic sound-recording strip sheet 9 can be made without changing the sizes or shapes of the conventional instant-printing film. The application of the magnetic sound-recording band layer or sheet of the present invention to the instant-printing film can be made for any instant-printing films of various manufactures.

The place of forming the magnetic sound-recording band layer or sheet is not necessarily limited to the backside of the developing liquid bag of the film, but can be on the front or back at any part of face, depending on the configuration of the instant-printing film. For example, the magnetic sound-recording band can be formed on a backside face of a part of the peripheral frame 4 or of a soaking pad, which is for soaking residual developing-liquid and disposed on the opposite end of the developing solution bag 6 with respect to the exposure area of the film 5.

Figure 3A:
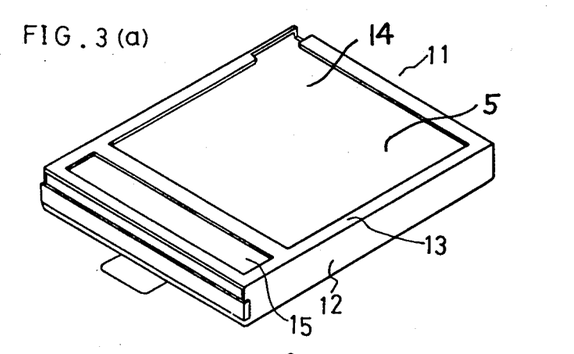
FIG. 3(a) is a perspective view of an example of a film pack case in accordance with the present invention.

FIG. 3(a) shows an example of a film pack case which contains a specified number of instant-printing films 5 shown by FIG. 1(a) and FIG. 1(b) or FIG. 2. The film pack case 11 has a peripheral frame 13 which contains, for example ten instant-printing films 5. The peripheral frame 13 has an oblong window 15 for exposing the magnetic sound-recording band 8 or 9 on the instant-printing film 5 therefrom, and a larger photographing window 14. The instant-printing films 5 are pressed upwardly (in FIG. 3(a)) in the frames 13 by known spring means (not shown). A magnetic recording/reproducing head as shown in FIG. 5(b) slidingly touches the magnetic sound-recording band 8 or 9 through the oblong window 15. By means of providing such oblong recording window 15, recording can be made on the magnetic sound-recording band 8 or 9 in a dark box of the instant-printing camera.

Figure 3B:
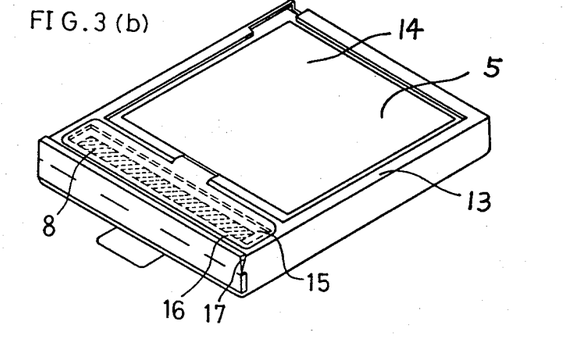
FIG. 3(b) is a perspective view of another example of a film pack case in accordance with the present invention.
Figure 3C:
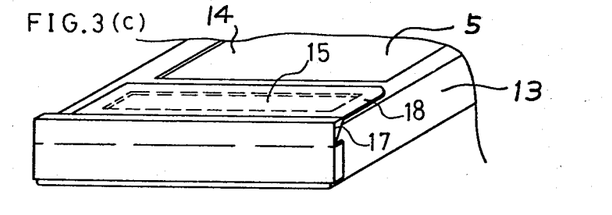
FIG. 3(c) is an enlarged partial perspective view of another example of a film pack case in accordance with the present invention.
Figure 3D:
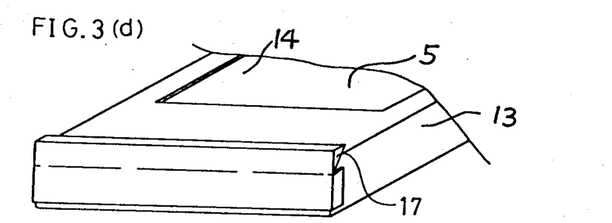
FIG. 3(d) is an enlarged partial perspective view of a conventional film pack case in accordance with the present invention.

In such film pack case having the recording window 15, there may be a possibility of undersirable leakage of light through the recording window 15 to the photographic film. Accordingly in a further modified example shown in FIG. 3(b), a light shielding cover 16 having an adhesive on the back face thereof is provided to cover the window, in order to prevent the abovementioned undesirable light leakage to the film face. Of course, the exposuring window 14 has a known light shielding cover at first, and therefore, together with the light shielding cover 16 which covers the recording window, the undesirable leakage of light can be prevented. The light shielding cover 16 is removed immediately after or during installation of the film pack case in the camera. Pack cases of some types of the instant-printing film has such easy-removable end cover 17 at the end part as shown in FIG. 3(d) in order to prevent light leakage from the film outlet at the end part of the pack case. Accordingly, by linking the end cover 17 and a light shielding cover 18 to each other as shown in FIG. 3(c), the adhesively-attached light shielding cover 18 can be easily removed simultaneously with the end cover 17. As a result, the light leakage is completely prevented.

Figure 4A:
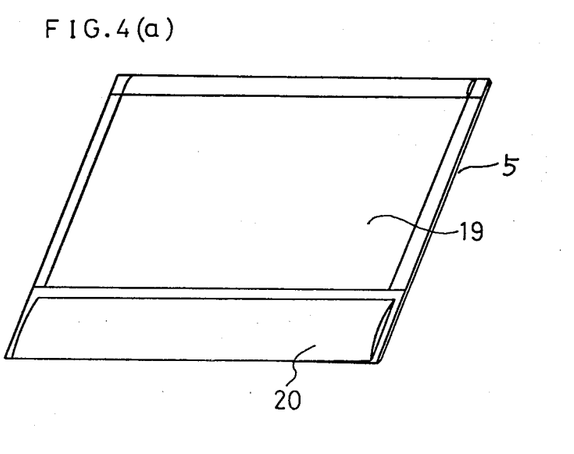
FIG. 4(a) is a perspective view of the back face of a modified example of an instant-printing film in accordance with the present invention.

Some other kinds of instant-printing films have a bag 20 of developing solution on an end part of the same face as the exposure face 19 of the film, as shown in FIG. 4(a). The surface of the developing solution bag 20 is soft and does not have a fixed face, and therefore, if a magnetic sound-recording band is disposed on the surface of the bag, a satisfactory recording/reproducing of sound will be difficult. Therefore, for such type of instant-printing films, it is recommendable that the sound recording should be made after development of the film and subsequent removal of the developing solution bag 20.

Figure 4B:
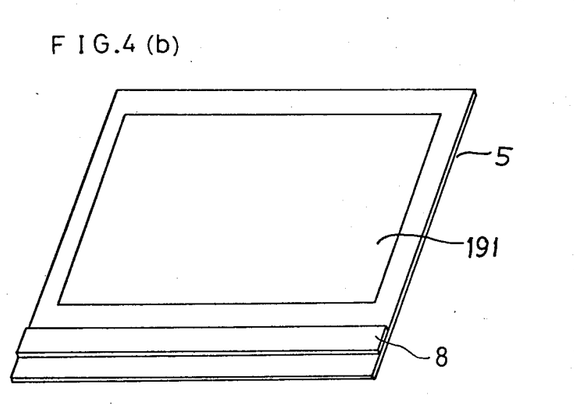
FIG. 4(b) is a perspective view of the front face of a modified example of the film of FIG. 4(a).

An example of the magnetic sound-recording strip layer for such type instant-printing film is shown in FIG. 4(b), wherein the magnetic sound-recording band 8 is disposed on the back face of the part on which the developing solution bag 20 is disposed. In such type of the film, the recording should be made after development of the film.

Another example of the magnetic sound-recording strip layer for the type of the instant-printing film is that, as shown in FIG. 2, at first the magnetic sound-recording strip has not been formed on the film 5, and after the development of the film, the magnetic sound-recording strip is attached to a suitable part of the surface of the film. The sound recording can be made either before or after the development of the film or even before the photographing. The attachment of the magnetic sound-recording strip can be made either manually or mechanically. The instant-printing films shown in FIG. 4(b) having the magnetic sound-recording strip layer 8 on the back face 191 of the film can also be recorded by an instant-printing camera with the recording means for the other type films with the magnetic sound-recording band 8 on the front side as shown by FIG. 1(a) by installing the film in the recording position in inverse relation with respect to the front and back faces.

A camera in accordance with the present invention in which the sound-recording instant-printing film is used to take photographs and record sound comprises a known photographing and instant-printing means, and further comprises a recording/reproducing head which moves relatively to and slides on the magnetic sound-recording band 8 or 9.

Figure 5A:
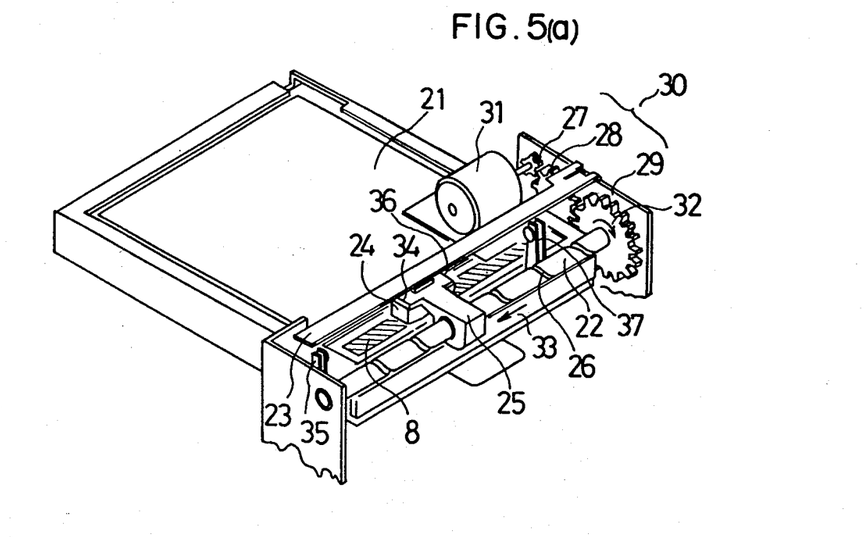
FIG. 5(a) is a perspective view of an example of a recording part of a camera in accordance with the present invention.
Figure 5B:
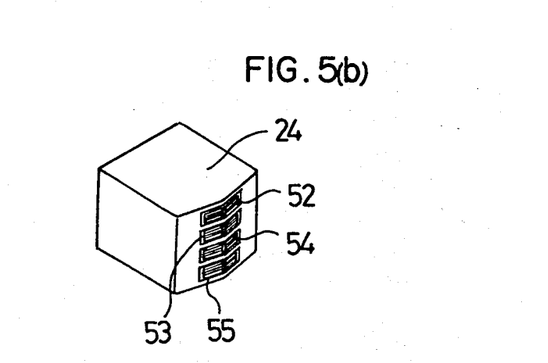
FIG. 5(b) is a perspective view of an example of a magnetic head of the recording part of FIG. 5(a).

FIG. 5(a) shows mechanical configuration of one example of such instant-printing camera which is for the instant-printing film of FIG. 1(a). A recording/reproducing head 24 is pressed by a pressing spring 23 against a magnetic sound-recording band 8 on an instant-printing film 21 and is driven to sweep on the magnetic sound-recording band 8. The recording/reproducing head 24 is fixed to a fixing means 25, which is fitted into a groove 26 on a travelling screw 22. The travelling screw 22 is mechanically linked with a drive motor 31 via a reduction means 30 comprising gears 27, 28 and 29 so that the travelling screw 22 slowly rotates in accordance with the rotation of the drive motor 31 and that the fixing means 25 sweeps on the magnetic sound-recording band 8 in a horizontal direction. When the travelling screw 22 rotates in a direction shown by an arrow 32, the fixing means 25 moves in a horizontal direction shown by an arrow 33 in FIG. 5(a).

Therefore, the recording/reproducing head 24 sweeps on the magnetic sound-recording band 8 from right to left. When the recording/reproducing head 24 reaches the left end part of the magnetic sound-recording band 8, a switch 35 is actuated by a left end part 34 of the fixing means 25 thereby feeding a logic signal to a motor control circuit 45 in FIG. 6. Then, the motor control circuit 45 controls the rotational direction of the travelling screw 22 to rotate it in the opposite direction to that shown by the arrow 32. Accordingly, the fixing means 25 moves in the opposite direction to that shown by the arrow 33. When the recording/reproducing head 24 reaches the right end part of the magnetic sound-recording band 8, a switch 37 is actuated by a right end part 36 of the fixing means 25 and the rotational direction of the drive motor 31 is again inverted under the control of the motor control circuit 45. Similarly, the recording/reproducing head 24 reciprocatively sweeps on the magnetic sound-recording band 8.

FIG. 5(b) is an enlarged view of an example of the recording/reproducing head 24 used in the instant-printing film camera in accordance with the present invention. The recording/reproducing head 24 comprises four heads. They are a first head 52, . . . , and a fourth head 55 from top to bottom. Therefore, the recording time is made four times of that a single track by using four recording tracks on the magnetic sound-recording band 8 by operatively selected in turn the respective heads among four heads 52-55 when the recording/reproducing head 24 reciprocatively sweeps on the magnetic sound-recording band 8.

Elucidation of an example of calculation is given for the recording time below by comparison with a microcassette tape under Philips standard. When the sound-recording is made by employing the minimum microcassette tape speed of 1.2 cm/sec. (this gives sufficient results for most recording items such as human voices) and the length of the magnetic sound-recording band 8 is assumed to be 8 cm, then the recording can be made for 6.6 sec. with one recording track on the magnetic sound-recording band 8. Therefore, total recording time amounts to 26.4 seconds (6.6 sec.×4) by successively using four tracks by the abovementioned automatic switching. This is a sufficient time for the instant-printing film camera in accordance with the present invention.

Figure 6:
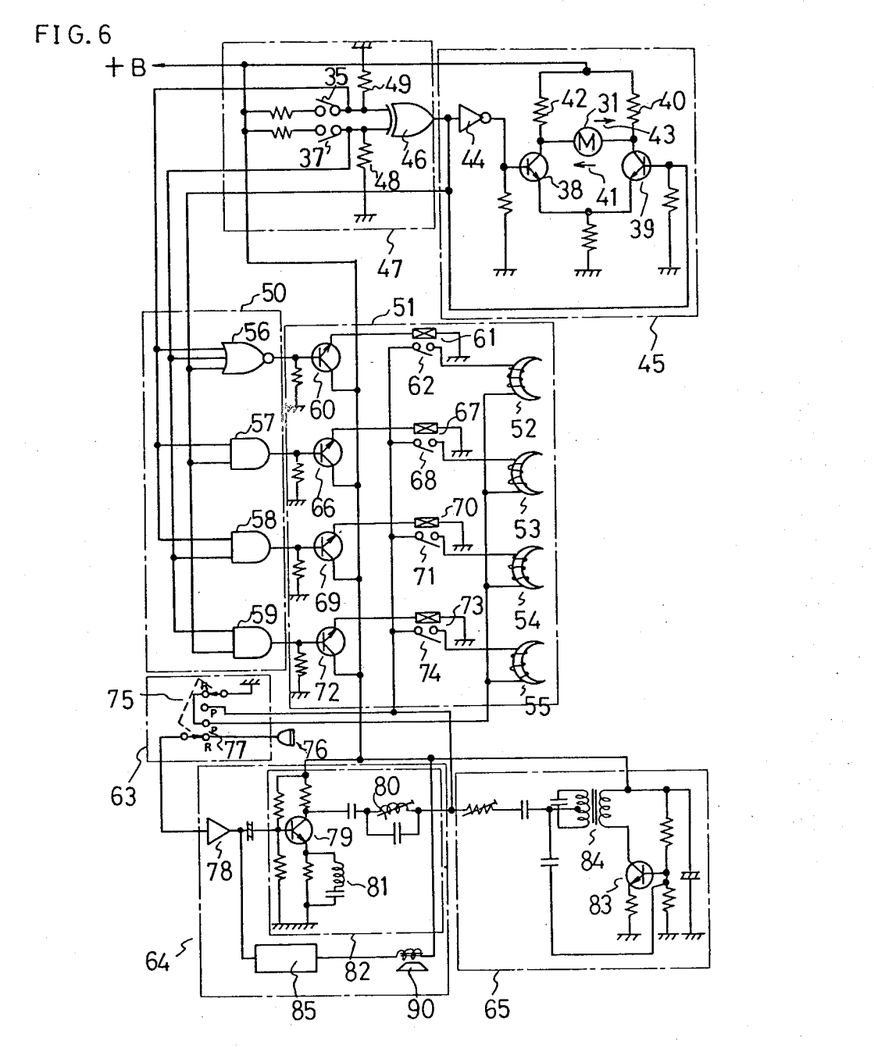
FIG. 6 is an example of an electric circuit diagram of the recording part of FIG. 5(a).

The control operation of the motor control circuit 45 for the reciprocative sweeping of the recording/reproducing head 24 is elucidated below in detail with reference to FIG. 6. Circuit in FIG. 6 is constituted to control the sound-recording so as to select one head among four heads and switches in turn in the recording/reproducing head during while the recording/reproducing head reciprocatively sweeps on the magnetic soundrecording band 8.

A motor control circuit 45 for controlling a drive motor for driving the magnetic head comprises two transistors 38 and 39, by which current flow directions in the drive motor coil are alternately interchanged. The motor control circuit 45 controls the rotational direction of the drive motor 31. The motor control circuit 45 is so constituted that the transistor 38 is on when the transistor 39 is off and that on the contrary the transistor 39 is on when the transistor 38 is off. When the transistor 38 is on and the transistor 39 is off, current flows through a resistor 40 to the drive motor 31 in a direction shown by an arrow 41. On the contrary, when the transistor 39 is on and the transistor 38 is off, current flows through a resistor 42 to the drive motor 31 in an opposite direction shown by an arrow 43.

An input terminal and an output terminal of an inverter 44 are connected to the bases of the transistors 38 and 39, respectively. Signal levels to be applied to the bases of the transistors are opposite to each other so as to make one of the transistors turn on. Therefore, the rotational direction of the drive motor 31 is consequently controlled in accordance with the logic level states of the signal applied to the inverter 44. The logic signal applied to the inverter 44 is fed from an exclusive OR circuit 46 in a direction control circuit 47, which further comprises the switches 35 and 37. The function of the direction control circuit 47 is elucidated by referring to Table 1.

TABLE 1

| | switch 35 | switch 37 | output of Ex-OR 46 | moving direction of head 24 |
|---|---|---|---|---|
| I | OFF(L) | OFF(L) | L | left |
| II | ON (H) | OFF(L) | H | right |
| III | ON (H) | ON (H) | L | left |
| IV | OFF(L) | ON (H) | H | right |

When the recording/reproducing head 24 is initially at the right end of the magnetic recording band 8, the switches 35 and 37 are set to be off (state I in Table 1) and hence, high logic levels are not applied to the exclusive OR circuit 46. The logic levels at the input terminals of the exclusive OR circuit 46 are also shown in parentheses. In the state I the output signal level of the exclusive OR circuit 46 is L (low level).

The logic circuit of FIG. 6 is formed by C-MOS ICs (complementary MOS ICs) in this embodiment, but it is naturally possible to form it by TTLs (transistor transistor logics) and IIL (integrated injection logic).

When the output signal level of the exclusive OR circuit 56 becomes L in the state I, the level L is applied to the base of the transistor 39 thereby turning off the transistor 39 and the inverted level H (high level) through the inverter 44 is applied to the base of the transistor 38 thereby turning on the transistor 38. Accordingly, current flows through the drive motor 31 in the direction shown by the arrow 41 and the recording/reproducing head 24 moves in the leftward direction shown by the arrow 33 in FIG. 5(a). The rotational direction of the drive motor 31 and the sweeping direction of the recording/reproducing head 24 can arbitrarily be determined and designed by the mechanical and structural combination of the reduction gear means 30 and the travelling screw 22. Now, let us assume in this embodiment that the recording/reproducing head 24 sweeps in the leftward direction shown by the arrow 33 when the current flows through the drive motor 31 in the direction shown by the arrow 41.

When the recording/reproducing head 24 reaches the left end of the magnetic recording band 8, the switch 35 is actuated by the left end part 34 of the recording/reproducing head 24. The switch 35 turns on and high logic level comes out via a resistor 49. The output logic level of the exclusive OR circuit 46 turns to H thereby turning on the transistor 39 and turning off the transistor 38. Accordingly, the current flow through the drive motor 31 is reversed and it flows in the direction shown by the arrow 43. The recording/reproducing head begins sweeping in the rightward direction opposite to the one shown by the arrow 33. This state is shown as state II in Table 1.

After the recording/reproducing head 24 has swept on the magnetic recording band 8 in the rightward direction and when it reaches the right end of the magnetic recording band 8, the switch 37 is changed over by the right end part 36 of the recording/reproducing head 24. Then, the recording/reproducing head 24 sweeps again in the leftward direction shown by the arrow 33. This situation corresponds to a state shown as state III in Table 1. In this embodiment the switches 35 and 37 are such types that they keep the turn-on state once they are turned on and that they are turned off by the successive switching actuation keeping the turn-off state.

After the recording/reproducing head 24 sweeps in the state IV shown in Table 1, it begins sweeping again in a sequential order from state I to state IV.

A head change-over circuit 50 and a head drive circuit 51 are further provided in the circuit of FIG. 6. The former switches to select one tracking head among four tracking heads 52-55 provided in the recording/reproducing head 24 in turn in cooperation to motions of the head that the recording/reproducing head 24 reciprocatively sweeps on the magnetic recording band 8 by the control of the latter. The output signals of the direction control circuit 47 are fed to the head change-over circuit 50. The logic function of the several parts in the circuit of FIG. 6 are shown in Table 2, wherein the logic levels H and L for the switches 35 and 37 correspond to the on- and off-states, respectively. Operational modes in the states I–IV in Table 1 are similarly designated in Table 2. The logic levels H and L for four tracking heads 52–55 correspond to operational and non-operational states of the tracking heads 52–55, respectively.

Figure 7:
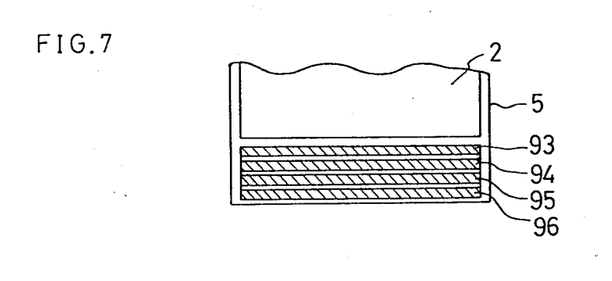
FIG. 7 is a front view of an instant-printing film showing magnetic recording bands on a part thereof.

When the logic signals corresponding to the state I shown in Table 2 are fed to a NOR gate 56 and AND gates 57, 58 and 59 in the head change-over circuit 50, the output logic levels become H for the NOR gate 56 and L for AND gates 57, 58 and 59, respectively. Accordingly, a transistor 60 turns on thereby actuating a relay 61 connected with the emitter of the transistor 60. A switch 62 is closed by the actuation of the relay 61 and the first head 52 is electrically connected with a recording/reproducing amplifier circuit 64 and an AC bias circuit 65 via a recording/reproducing change-over circuit 63. As described above, the recording/reproducing head 24 sweeps on the magnetic recording band 8 in the leftward direction (shown by the arrow 33 in FIG. 5(a)) in the state I, and therefore recording or reproducing is made by means of the first head 52 for a first track 93 on the magnetic recording band 8 shown in FIG. 7 in the leftward direction.

TABLE 2

| | | output of Ex-OR 46 | moving direction of head 24 | state of heads | | | |
|---|---|---|---|---|---|---|---|
| switch 35 | switch 37 | | | 1st head 52 | 2nd head 53 | 3rd head 54 | 4th head 55 |
| I | L | L | L | left | H | L | L | L |
| II | H | L | H | right | L | H | L | L |
| III | H | H | L | left | L | L | H | L |
| IV | L | H | H | right | L | L | L | H |

When the operational mode is turned into the state II by the actuation of the switch 35, the output logic levels become H for the AND gate 57 and L for the NOR gate 56 and the AND gates 58 and 59, respectively. Accordingly, the transistor 60 turns off and a transistor 66 turns on thereby actuating a relay 67 connected with the emitter of the transistor 66. A switch 68 is closed by the actuation of the relay 67 and the second head 53 is electrically connected with the recording/reproducing amplifier circuit 64 and the AC bias circuit 65 via the recording/reproducing change-over circuit 63. The recording/reproducing head 24 sweeps on the magnetic recording band 8 in the rightward direction opposite to that shown by the arrow in FIG. 5(a) in the state II, and therefore recording or reproducing is made by means of the second head 53 for a second track 94 on the magnetic recording band 8 shown in FIG. 7 in the rightward direction. During this recording or reproducing time by the second head 53, no recording nor reproducing is made by the first head 52 since the switch 62 was turned off when the transistor 60 was made off.

When the operational mode is turned into the state III by the actuation of the switch 37, the output logic levels become H for the AND gate 58 and L for the NOR gate 56 and the AND gates 57 and 59, respectively. Accordingly, the transistor 66 turns off and a transistor 69 turns on thereby actuating a relay 70 connected with the emitter of the transistor 69. A switch 70 is therefore closed and the electrical connection is made for the third head 54. In the state III, recording or reproducing is made by the third head 54 for a third track 95 on the magnetic recording band 8 in the leftward direction along the arrow 33.

Similarly, recording or reproducing is made in the state IV by the fourth head 55 for a fourth track 96 on the magnetic recording band 8 while the recording/reproducing head 24 sweeps on the magnetic recording band 8 in the rightward direction.

Therefore, the recording time on the magnetic recording band 8 can be made four times of a single sweeping by successively selecting one appropriate head among four heads for the recording head in accordance with the reciprocative sweeping of the recording/reproducing head 24. The apparatus in accordance with the abovementioned example is so designed that the selection of the head is made in accordance with the operational states (ON and OFF) of the switches 35 and 37. Therefore, recording is made for different recording tracks on the magnetic recording band 8 by one specified head among four heads in one specified direction.

The circuit of FIG. 6 further comprises the recording/reproducing change-over circuit 63, the recording/reproducing amplifier circuit 64 and the AC bias circuit 65. The constitution and operation of these circuits are known and accordingly, their details are not elucidated here. The recording/reproducing change-over circuit 63 selects functional modes of the recording/reproducing head 24 by means of an interlocking switch 75. When the interlocking switch 75 is connected to terminals R, the head drive circuit 51, the recording/reproducing amplifier circuit 64 and the AC bias circuit 65 are in the recording mode. On the contrary, they are in the playing (reproducing) mode when the interlocking switch 75 is connected with terminals P.

In the recording mode, sound signals from a microphone 76 are fed to the recording/reproducing amplifier circuit 64 via a switch 77 of the interlocking switch 75. The recording/reproducing amplifier circuit 64 comprises a low frequency amplifier 78 and an output circuit 82, the latter circuit comprising a transistor 79, an equalizer 80 and a bias trap 81. The amplified recording signals are then fed to one head among four heads in the recording/reproducing head 24.

In general, an AC bias signal having a frequency as high as about five times of that of the maximum recording frequency is superimposed to the recording signals in a recording apparatus in order to obtain a good recording characteristics. In this example of FIG. 6, an AC bias circuit 65 comprises a transistor 83 and a transformer 84. AC bias signal from the AC bias circuit 65 and the recording signals are mixed and fed to one head of the recording/reproducing head 24.

In the playing mode, sound signals are reproduced from the magnetic sound-recording band 8 by the recording/reproducing head 24. The reproduced sound signals are fed to the low frequency amplifier 78 and amplified. Then, power amplification is made in an amplifier circuit 85 thereby reproducing the recorded sound by a loudspeaker 90.

As described above, the instant-printing film camera of FIG. 5(a) with the recording/reproducing circuits of FIG. 6 is so constituted that a long recording time is obtainable for the limited space on the magnetic sound-recording band 8. It is naturally possible to further lengthen the recording time by disposing more unit heads in the recording/reproducing head 24. The recording order for the tracks on the magnetic sound-recording band 8 can be modified from the abovementioned sequential sweeping to an interlaced sweeping. Such interlaced sweeping diminishes cross-talks between the neighboring tracks.

Figure 8:
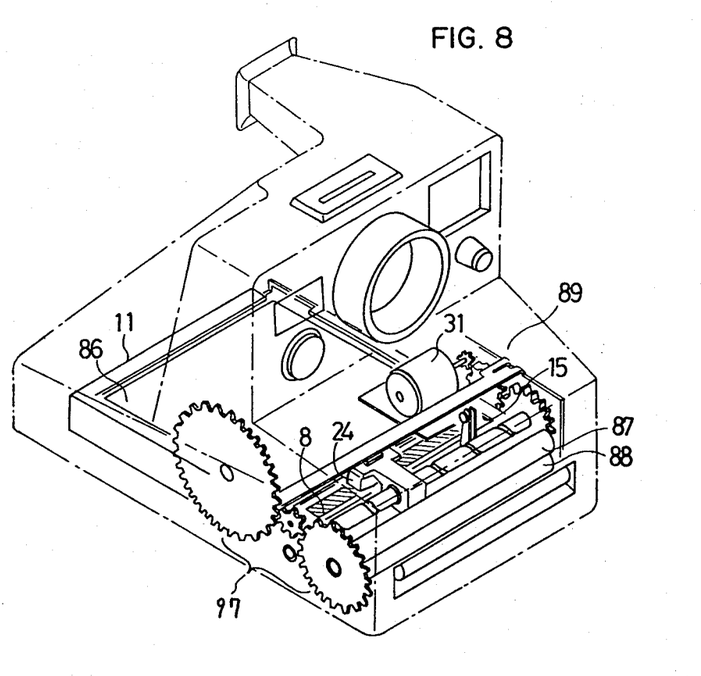
FIG. 8 is a perspective view of a modified example of a camera in accordance with the present invention.
Figure 9:
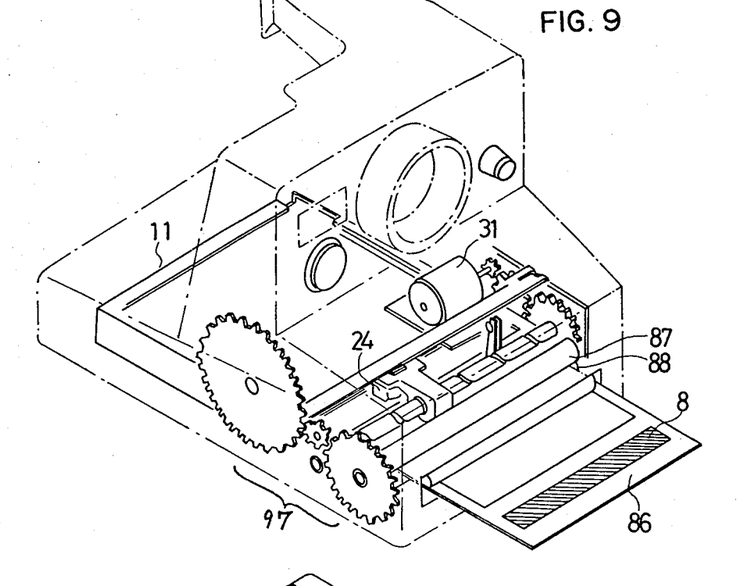
FIG. 9 is a perspective view showing a state of an operation of the camera of FIG. 8.

FIG. 8 shows a perspective view of the instant-printing film camera having the recording/reproducing apparatus of FIG. 6 built inside the camera body. Such camera is referred to hereinafter instant camera with recording apparatus. Photographing system of the instant camera with recording apparatus has similar configuration as the conventional one except for the magnetic recording part. A film pack case 11 of FIG. 3(a) having ten instant-printing films with the magnetic sound-recording band is used for the instant camera with recording apparatus of FIG. 8. The instant-printing film with the magnetic sound-recording band is taken out and printed by a gear means 97, which is driven by a printing motor (not shown). The uppermost instant-printing film 86 with the magnetic sound-recording band in the film pack case 11 is pushed out by a lever (not shown) and then clamped between two rollers 87 and 88 connected with the gear means 97. Then, the instant-printing film 86 with the magnetic sound-recording band 8 is taken out by the rotation of the rollers 87 and 88 as shown in FIG. 9. During the abovementioned feeding-out of the instant-printing film 86 the bag 6 of the developing solution is subjected to receive a mechanical pressure between two rollers 87 and 88. As in the conventional way, the developing solution then spreads onto the photosensitive emulsion layer 3 thereby developing and printing the instant-printing film 86 in a specified length of time.

Sound recording on the magnetic sound-recording band 8 formed on the instant-printing film 86 is made by the mechanical system of FIG. 5(a) and the recording apparatus 89 including the electric control means of FIG. 6. The recording apparatus 89 is disposed inside the camera body and the recording/reproducing head 24 sweeps on the magnetic sound-recording band 8 exposed from the recording window 15.

Since the film pack case 11 and the recording apparatus 89 are disposed inside the camera body, recording is possible for the instant-printing film 86 with the magnetic sound-recording band 8 before photographing. Besides, it is also possible to record sounds after photographing, by withholding the feeding-out of the instant-printing film 86 with the magnetic sound-recording band 8 for a short time. Therefore, the instant camera with recording apparatus in accordance with the present invention has an advantageous feature that the sound recording is possible both before and after the photographing.

When the recording apparatus 89 further comprises a recording/reproducing change-over circuit 63 and a recording/reproducing amplifier circuit 64 of FIG. 6 in the camera body, it is also possible to confirm immediately after recording whether the sounds are well recorded. It is preferable that the recorded sounds can be reproduced from the recorded magnetic sound-recording band 8 at an instant photographing place. This is possible by installing the abovementioned circuits 63 and 64 in the camera body thereby utilizing the conventional Wasteful time during the developing time after photographing.

Figure 10:
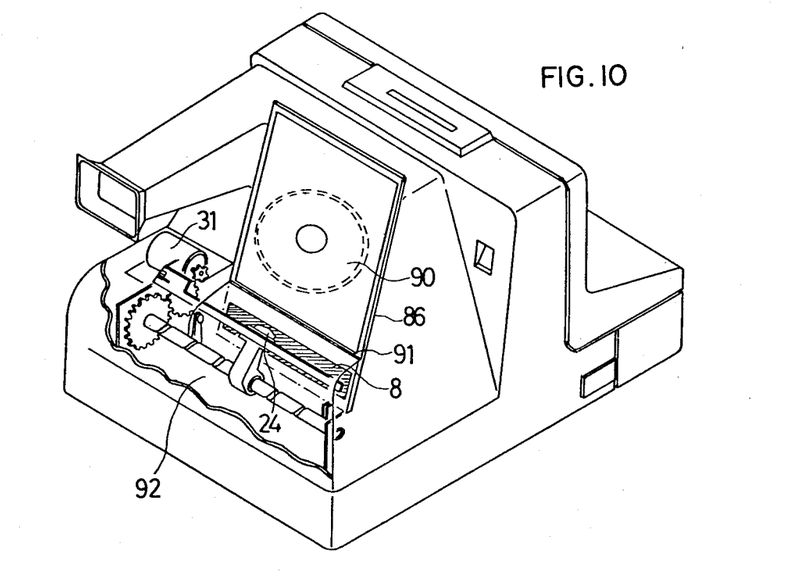
FIG. 10 is a perspective view showing a further modified example of a camera in accordance with the present invention.

FIG. 10 is a perspective view of another example of the instant camera with recording apparatus. The photographing mechanism of this example has similar configuration as the conventional one except for the magnetic recording part. The light from the photographing object passes through a main lens (not shown), is bent by 90° by a reflection mirror (not shown) and focuses on a photosensitive face on the instant-printing film 86. Such type of instant camera generally has a sloped back face due to the optical configuration with the reflection mirror. By utilizing such sloped back face, a loudspeaker 90 of a reproducing apparatus 92 is provided in the instant camera with recording apparatus of FIG. 10. The loudspeaker 90 is disposed in the camera body along the sloped face and the reproducing apparatus 92 is disposed under the reflection mirror. The recorded instant-printing film 86 with the magnetic sound-recording band 8 is inserted from the upper part of the sloped part and fitted in the sloped part of the instant camera with recording apparatus.

When the recorded instant-printing film 86 with the magnetic sound-recording band 8 is inserted through an insertion slot 91, then the recording/reproducing head 24 is disposed on the magnetic sound-recording band 8. Then a start switch (not shown but having known actuating knob to be pressed by the film 86) is actuated thereby starting reproducing from four tracks 93–96. In this example, observation of the photographed image on the instant-printing film becomes easy by disposing the instant-printing film 86 with the magnetic sound-recording band 8 in the sloped part along the reflection mirror. A photographer can clearly hear the recorded sound from the loudspeaker 90 disposed in the sloped face.

Moreover, it is naturally possible to install both a recording circuit and a playing circuit in the instant camera with recording apparatus of FIG. 10, thereby enabling the editing by monitoring and recording in the magnetic sound-recording band and/or enabling the recording of music sounds or any other sounds in the studio or home. A microphone for the sound recording can be attached to any part of the camera body of the instant camera with recording apparatus or can be made detachable and fitted by an appropriate clamp means. According to the example of FIG. 10, the sound recording is also possible before and after photographing for a packed instant-printing film, which does not have a recorded band. This is accomplished by making the sound recording on the magnetic recording sheet 9 of FIG. 2 which is sticked on an end part of the film after photographing. This sticking of the recorded magnetic sheet 9 on the instant-printing film can be made in an automatical manner by using an appropriate jig or the like means.

What is claimed is:
1. In combination:
an instant-printing film including:
 a surface layer,
 a back sheet,
 a photo-sensitive emulsion layer in between said surface layer and said back sheet,
 a frame surrounding the periphery of said surface layer, back sheet and photo-sensitive emulsion layer,
 a bag of developing solution disposed on a part of said frame, and
 a magnetic recording band disposed on at least one side of said frame of said instant-printing film; and a film pack case adapted to receive said film and to be disposed in an instant-printing camera said case including means defining a recording opening through which a magnetic head may touch said recording band.

2. A combination in accordance with claim 1, wherein said magnetic recording band comprises a layer of a mixture of a binder and a powdered ferromagnetic substance, said layer being magnetically oriented in lengthwise direction of said magnetic recording band.

3. A combination in accordance with claim 1, wherein said magnetic recording band is an oblong sheet having a layer containing ferromagnetic substance powder, the layer being bonded with an adhesive layer on said photographic film.

4. A combination in accordance with claim 1, wherein said film pack case has a light shielding cover which covers said recording opening until the film pack case is installed in said instant-printing camera.

5. An combination in accordance with claim 4, wherein said light shielding cover comprises a light-shielding film and an adhesive layer.

6. An instant-printing camera comprising:
a dark box;
a photographic lens;
an instant-printing film pack case having a plurality of instant-printing films, each of said films being formed by a surface layer, a back sheet, a photosensitive emulsion layer disposed between said surface layer and back sheet, a frame surrounding their periphery and a magnetic band disposed on at least one side of said frame, said frame having a bag of developing solution on a part of said frame and an instant-printing means, said case including means defining an aperature for exposing said band;
a shutter for making a photographic exposure of light focused by said photographic lens on said instant-printing film;
magnetic recording means for magnetically recording a signal on said magnetic band, said magnetic recording means including a magnetic recording-/reproducing head;
a driving means for moving said magnetic recording-/reproducing head with respect to said magnetic band; and
an electric control circuit for operatively controlling said driving and switching of said magnetic recording/reproducing head.

7. An instant-printing camera in accordance with claim 6, wherein
said magnetic recording/reproducing head has a specified number of individual heads for recording and reproducing signals on plural channels in said magnetic band and
said electric control circuit comprises a switching means which connects said individual heads in turn to a recording/reproducing circuit in relation to said relative driving of the magnetic head.

8. An instant-printing camera in accordance with claim 6, wherein
said magnetic head comprises a specified number of individual heads arranged in a row vertical to the lengthwise direction of the magnetic recording band and
said electric control means has head switching means which switches the connection of said unit heads in turn to the recording reproducing circuit, and another switching means which reverses the direction of the rotation of said driving means.

9. An instant-printing camera in accordance with claim 6, wherein said magnetic recording/reproducing head is mounted on a slider which is driven lengthwise of the magnetic recording band by rotation of a driving screw.

10. An instant-printing camera in accordance with claim 9, wherein:
said camera further comprises a rotating means for said driving screw, said rotating means including a reversible electric motor coupled through a speed reduction means to said driving screw means;
said magnetic head includes a plurality of individual heads; and
said control circuit further comprises means for connecting said individual heads in turn to the recording or reproducing circuit, and another switching means for reversing direction of the rotation of the reversible electric motor.

11. An instant-printing camera in accordance with claim 8, wherein said driving means comprises
a slider on which said recording/reproducing head is mounted and which is driven lengthwise of the magnetic recording band by the reversible rotation of a driving screw driven by a reversible electric motor, and
a direction control circuit for generating electric output to said motor and switching the direction of the electric output responding to the relative position of said recording/reproducing head.

12. An instant-printing camera in accordance with claim 8, wherein said head switching means is connected to said individual heads and comprises an electronic change-over switching circuit for selectively switching one individual head in turn in response to motion of the magnetic head.

13. An instant-printing camera in accordance with claim 12 further comprising a recording amplifier circuit for amplifying recorded sound signals and a bias circuit for generating a recording bias signal with a frequency higher than that of the recording signals to be fed to said recording/reproducing head.

14. An instant-printing camera in accordance with 6, wherein said reproducing apparatus is disposed with said magnetic recording means in a camera body.

15. An instant-printing camera in accordance with claim 6, wherein said reproducing apparatus is disposed along a side face of a camera body.

16. An instant-printing camera in accordance with claim 6, wherein said magnetic recording means further comprises a sound reproducing apparatus for reproducing signals recorded on said magnetic recording band, said reproducing apparatus comprises a recording/reproducing change-over circuit and a reproducing amplifier circuit for reproducing the recorded sound signals.

* * * * *